(12) United States Patent
Harper et al.

(10) Patent No.: US 12,378,009 B2
(45) Date of Patent: Aug. 5, 2025

(54) HEAT FINS FOR HEAT DISSIPATION OF ROCKET COMPONENTS

(71) Applicant: Blue Origin Manufacturing, LLC, Huntsville, AL (US)

(72) Inventors: David Harper, Huntsville, AL (US); Jeramy Kimball, Seattle, WA (US); Logan Sailer, Seattle, WA (US); Curtis Wen, Seattle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/669,991

(22) Filed: May 21, 2024

(65) Prior Publication Data
US 2024/0300676 A1 Sep. 12, 2024

Related U.S. Application Data

(62) Division of application No. 17/466,510, filed on Sep. 3, 2021, now Pat. No. 12,024,318.

(51) Int. Cl.
*B64G 1/58* (2006.01)
*B64G 1/40* (2006.01)
*F28F 3/02* (2006.01)

(52) U.S. Cl.
CPC .............. *B64G 1/58* (2013.01); *B64G 1/4021* (2023.08); *F28F 3/02* (2013.01)

(58) Field of Classification Search
CPC ........ B64G 1/58; B64G 1/402; B64G 1/4021; B64G 1/4022; B64G 1/4024; B64G 1/4026
See application file for complete search history.

(56) References Cited

U.S. PATENT DOCUMENTS

| | | | |
|---|---|---|---|
| 3,439,503 A | 1/1969 | Frieman et al. | |
| 7,827,969 B2 | 11/2010 | Yamamoto et al. | |
| 7,854,598 B2 | 12/2010 | Suzuki | |
| 7,891,386 B2 | 2/2011 | Handa | |
| 9,694,894 B2 | 7/2017 | Deakin | |
| 2006/0237166 A1* | 10/2006 | Otey | F28F 3/02 165/170 |
| 2010/0001141 A1 | 1/2010 | Jondeau et al. | |
| 2015/0345708 A1 | 12/2015 | Sloan et al. | |
| 2016/0288926 A1 | 10/2016 | Smith et al. | |

(Continued)

FOREIGN PATENT DOCUMENTS

| | | |
|---|---|---|
| CN | 106025488 | 10/2016 |
| JP | 3978210 B2 | 9/2007 |

*Primary Examiner* — Arfan Y. Sinaki
(74) *Attorney, Agent, or Firm* — Summit Patents PC

(57) ABSTRACT

Rocket components having internal heat fins are described herein. The disclosed components have internal heat fins that mitigate buckling and uneven force application by adding thermal capacity to the component without adding component stiffness. This reduces a thermal force fight (i.e., tension versus compression between cold and hot areas, respectively), which inhibits the buckling loads on the propellant tank. The internal heats fins also provide for a reduced mass of the propellant tank wall relative to a propellant tank wall without internal heat fins. By reducing the thermal force fight, as discussed above, less material can be used which further allows for thinner welds to be used (i.e., less welding material).

19 Claims, 4 Drawing Sheets

(56) References Cited

U.S. PATENT DOCUMENTS

| | | |
|---|---|---|
| 2019/0016483 A1* | 1/2019 | Ewing ................... B29C 70/42 |
| 2019/0056554 A1 | 2/2019 | Stone et al. |
| 2020/0166288 A1 | 5/2020 | Miller et al. |
| 2021/0061495 A1 | 3/2021 | Aston |

* cited by examiner

HEAT FINS FOR HEAT DISSIPATION OF ROCKET COMPONENTS

CROSS REFERENCE TO RELATED APPLICATIONS

This is a Divisional Application which claims priority and benefit from U.S. patent application Ser. No. 17/466,510, filed Sep. 3, 2021, titled, "HEAT FINS FOR HEAT DISSIPATION OF ROCKET COMPONENTS," which is incorporated herein by reference in its entirety for all purposes.

BACKGROUND

Rockets use a variety of components and systems. For example, propulsion systems, such as those used in rockets, use liquid propellants stored in propellant tanks. After a successful launch and disbursement of a carried payload, for example, the propellant tanks and other components can be returned to Earth to be re-used on other rockets. Conventional rocket components present a challenge of being able to withstand the heat experienced during launch and re-entry.

Conventional rockets may increase thermal capacity to account for increased thermal loads during launch, re-entry, or descent. The increased thermals loads can create large temperature mismatches rocket components. Conventional thermal protection to increase thermal capacity includes making component walls thicker or coating the component with a thermal protection shield. Conventional rockets therefore have increased axial stiffness, increased mass, the like, or combinations thereof. This can reduce engine performance or efficiency, inhibit rocket re-usability (i.e., forces exerted on the rocket can wear down certain components or create weak spots), subject the rocket to failure, or the like.

The art would benefit from a rocket engine that has improved construction and improved management of thermal loads.

DETAILED DESCRIPTION

Figure 1:
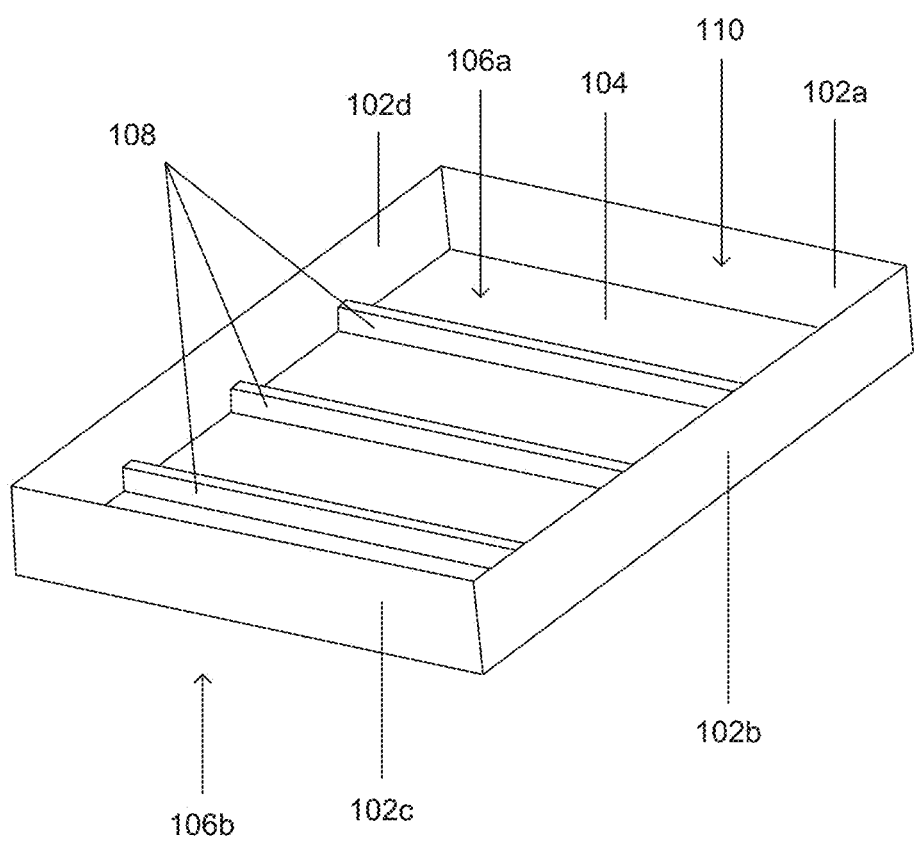
FIG. 1 illustrates an example panel having a first set of heat fins.

Systems and methods for improving thermal capacity of rocket components are described herein. Thermal loads during launch, re-entry, or descent of a rocket component, such as a propellant tank, create large temperature mismatches between different parts of the rocket component. Rocket components typically include thicker walls or use thermal protection shields to reduce the need for more thermal capacity. Thermal capacity is the amount of heat required to change the temperature of an object by a certain degree. Thermal capacity is an extensive property, which means that the thermal capacity varies with the amount of a substance forming the object. For example, with all other factors being equal, a thinner propellant tank wall has a lower thermal capacity than a thicker propellant tank wall.

By increasing thermal capacity, the rocket components can be subjected to increased heat loads (e.g., due to friction upon launch, re-entry, or descent) while reducing or eliminating wall buckling, uneven force application, or both wall buckling and uneven force application. Increasing wall thickness increases the thermal capacity of the rocket component, which reduces the maximum temperature reached by the rocket component by more quickly dissipating more heat. However, increasing wall thickness also adds axial stiffness. Therefore, the in-plane thermal forces remain high. The in-plane thermal forces remain high because hot areas of the rocket component exposed to heating expand, while cold areas of the rocket component resist the expansion. For example, the hot areas, which expand and generate higher compressive loads, can become buckling critical (i.e., increased probability of buckling) during launch, re-entry, or descent of the rocket component. The cold areas are subjected to tension loads greater than the mechanical loads, which jeopardizes the weld of the rocket component, which may require thicker welds.

Additionally, the in-plane thermal loads (plus other loads) can exceed the circumferential weld allowable for a baseline weld thickness. The heat fins can mitigate the loads in one or more areas of the rocket component, thereby removing the need to increase the weld thickness over the entirety of the rocket component. Thicker welds add mass and can also lead to other issues, including manufacturing difficulty, load eccentricity, and larger stiffness mismatches.

Furthermore, the walls of the rocket components can be kept thinner by adding a thermal protection shield (TPS). The TPS dissipates, reflects, or absorbs heat, which protects the object from overheating. However, each of the TPS and increased wall thickness adds mass to the rocket, which can reduce a rocket engine's performance or efficiency.

It is often desirable to increase the thermal capacity of the rocket components without increasing the axial or circumferential stiffness of the rocket components, minimizing the mass of the rocket components, or both. Therefore, improving the thermal capacity of the rocket component can reduce or eliminate wall buckling, uneven force application, or both wall buckling and uneven force application. The disclosed systems include rocket components having internal heat fins. The internal heat fins are on an internal surface of the rocket component and extend inwardly into the rocket component, such as towards a cavity. The internal heat fins do not add performance-reducing component stiffness and minimize mass impacts. Rather than adding component stiffness or excessive mass, the internal heat fins can be formed in the wall of the rocket component to increase thermal capacity by dissipating heat from the wall of the rocket. The increased thermal capacity reduces or eliminates wall buckling, uneven thermal force application, or both wall buckling and uneven thermal forces.

Component stiffness can refer to one or more of axial stiffness of a component, circumferential stiffness of a component, or stiffness in an x-, y-, or z-direction of a coordinate system (e.g., Cartesian coordinate system) of a component.

For example, axial stiffness is the force required to produce axial displacement. Axial stiffness is an extensive property, which means that stiffness varies with material property, shape, size, and boundary conditions. Therefore, when compared to thicker material, the panels with heat fins have less axial stiffness because of the reduced material. The lower axial stiffness permits the shell of the propellant tank to flex or stretch in response to the varying thermal loads. The flexing and stretching mitigates the stresses that are exerted on the welds joining the multiple panels to form the shell of the propellant tank.

The internal heat fins mitigate buckling and uneven force application by adding thermal capacity to the propellant tank (and reducing the maximum skin temperature) without adding component stiffness. The heat fins provide for heat dissipation without increasing component stiffness. The heat fins provide more surface area that extends into the environment into which the heat is dissipated. The heat is transferred to a fluid (e.g., liquid or gas) of the environment as the fluid flows over the heat fins.

Adding thermal capacity without increasing component stiffness reduces a thermal force fight, which inhibits the buckling loads on the propellant tank. The thermal force occurs when force acting in opposing directions are applied to a given area, such that the forces fight to pull or push the area in a given direction. For example, the thermal force fight in a rocket component can be caused by tension and compression acting on a rocket component between cold and hot areas, respectively.

The internal heat fins also allow for the thermal capacity of the propellant tank to be tailored independently of component stiffness. Therefore, the component stiffness can remain constant while changing the thermal capacity to account for changes in heat generated during launch, re-entry, or descent, unlike conventional rocket components in which changing thermal capacity changes component stiffness (which can cause additional problems). Maintaining component stiffness permits the shell of the propellant tank to have an appropriate or desired amount of flex or stretch in response to the varying thermal loads. The flexing and stretching can be selected to mitigate stresses that are exerted on the welds joining the multiple panels to form the shell of the propellant tank. The number of heat fins or other heat fin characteristics can be adjusted to provide a desired level of heat dissipation without affecting the component stiffness of the rocket component.

The internal heats fins also provide for a reduced mass of the propellant tank wall relative to a thicker propellant tank wall without internal heat fins. Walls having material cutout or removed to form the internal heat fins have less material and therefore less mass than walls without the heat fin, given the same initial thickness of each of the walls. By reducing the thermal force fight, as discussed above, less material can be used, which further allows for thinner welds to be used (i.e., less welding material).

For purposes of this disclosure, "heat fins" and "dissipation" or variations thereof are not limited to convection cooling. Rather, "heat fins" and "dissipation" or variations thereof are used to describe elements, components, or aspects of the invention discussed herein.

FIG. 1 shows a panel 110 having a first set of heat fins 108. The panel 110 is a flat or curved component which forms or is set into a surface of a shell of a propellant tank or other rocket component. The panel 110 is formed from sidewalls 102a-102d with a skin 104 extending between the sidewalls 102a-102d. The sidewalls 102a-102d collectively separate the panel 110 from adjacent panels. The skin 104 includes an interior side 106a and an exterior side 106b. The interior side 106a includes heat fins 108 extending in a direction towards the cavity of the propellant tank 100. The exterior side 106b is proximal to an external environment or atmosphere, such that a plurality of panels forms an external surface of the propellant tank or other rocket component when joined.

Figure 2:
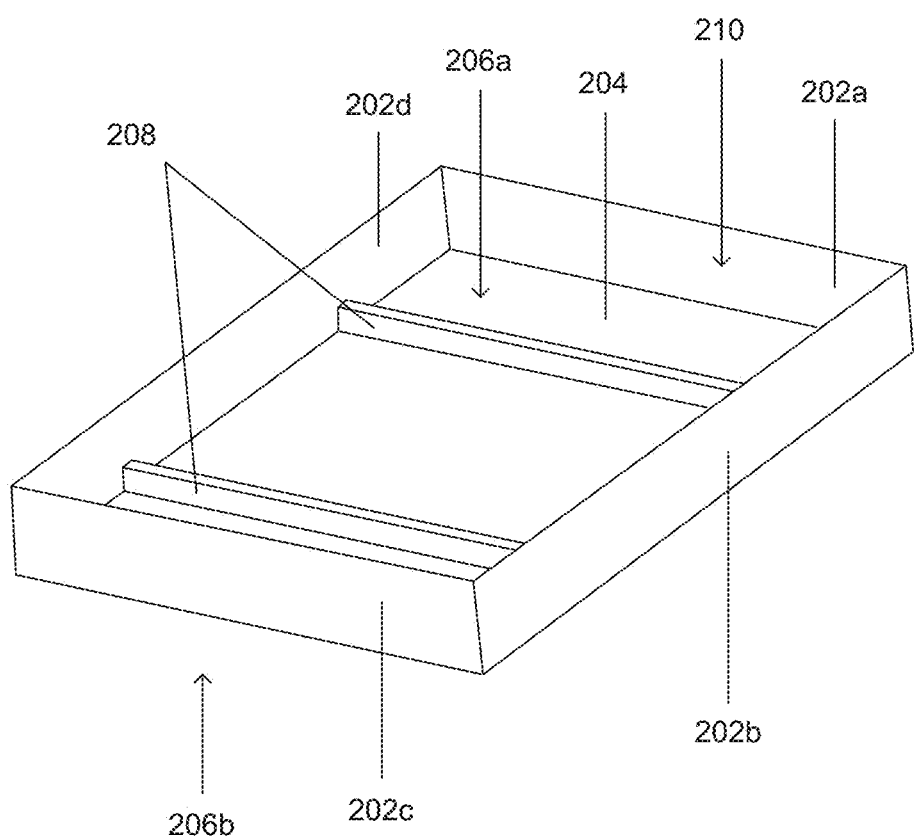
FIG. 2 illustrates an example panel having a second set of heat fins.

FIG. 2 shows a panel 210 having a second set of heat fins 208. The panel 210 is a flat or curved component which forms or is set into a surface of a shell of a propellant tank or other rocket component. The panel 210 is similar to the panel 110, except the panel 110 have fewer heat fins 208, and therefore has a lower thermal capacity to component stiffness ratio ("TCCS ratio"). The panel 210 is formed from sidewalls 202a-202d with a skin 204 extending between the sidewalls 202a-202d. The sidewalls 202a-202d collectively separate the panel 210 from adjacent panels. The skin 204 includes an interior side 206a and an exterior side 206b. The interior side 206a includes heat fins 208 extending in a direction towards the cavity of the propellant tank 100. The exterior side 206b is proximal to an external environment or atmosphere, such that a plurality of panels forms an external surface of the propellant tank or other rocket component when joined.

The heat fins 108, 208 provide for heat dissipation without increasing component stiffness. The heat fins 108, 208 provide more surface area that extends into the environment into which the heat is dissipated. The heat is transferred to a fluid (e.g., liquid or gas) of the environment as the fluid flows over the heat fins 108, 208.

Component stiffness is the force required to produce axial displacement. Component stiffness is an extensive property, which means that stiffness varies with material property, shape, size, and boundary conditions. Therefore, when compared to thicker material, the panels with heat fins have less component stiffness because of the reduced material. The lower component stiffness permits the shell of the propellant tank to flex or stretch in response to the varying thermal loads. The flexing and stretching mitigates the stresses that are exerted on the welds joining the multiple panels to form the shell of the propellant tank.

To form the panel 110, 210, a piece of material, such as a metal, a metal alloy (e.g., aluminum 2050), a ceramic, polymer, or the like, is provided. The piece of material can be a sheet having a thickness that is equal to a height of the sidewalls 102a-102d. The material then undergoes machining to remove part of the material from areas that do not form or are not a component of the panel 110, 210 (i.e., milling). For example, material between the sides of the material can be removed to form the sidewalls 102a-102d. Then, the remaining material can be removed to form the skin 104 and the heat fins 108. The heat fins 108 can extend from a first sidewall to a sidewall on opposing side of the panel 110. Individual panels can be formed and then welded together to form the shell (not shown) of the propellant tank 100.

To form adjacent panels, multiple panels similar to panel 110, 210 can be formed in a larger piece of materials. These larger materials, including multiple panels, can then be welded together to form the shell (not shown) of the propellant tank 100.

Example machining processes include mechanical machining (e.g., shearing, drilling, cutting, grinding, an abrasive process, or the like) or energy-based machining (e.g., electrochemical, thermal, chemical, or the like).

Figure 3:
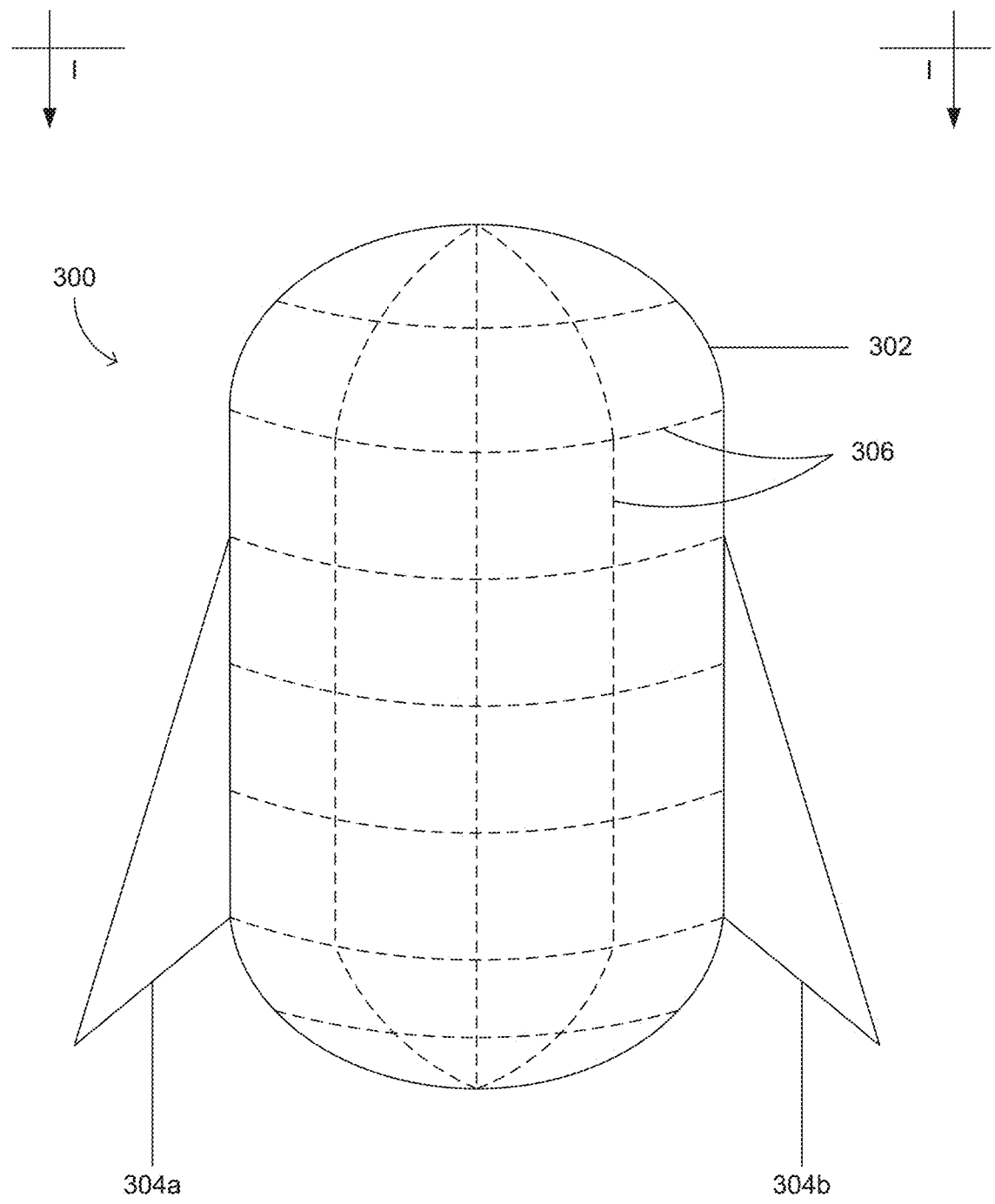
FIG. 3 illustrates an example propellant tank of a rocket.

FIG. 3 shows a propellant tank 300. Though the propellant tank 300 is discussed herein, the disclosure is not intended to be so limited. The propellant tank 300 is an example rocket component, such that the elements of the propellant tank 300 can be applied to any other rocket component.

The propellant tank 300 includes a shell 302 forming a cavity (not shown) to hold a liquid propellant. The propellant tank 300 also includes strakes 304a, 304b. The strakes 304a, 304b are aerodynamic surfaces mounted on the shell 302 to improve flight of a rocket during launch or the propellant tank 300 during re-entry (i.e., when the rocket component re-enters Earth's atmosphere) or descent (i.e., when the rocket component descents towards a surface of Earth). The strakes 304a, 304b can control airflow (e.g., generate large vortexes), stabilize the rocket or the propellant tank 300, or both control airflow and stabilize the rocket or the propellant tank 300.

The shell 302 can also include welds 306 to adjoin panels (not shown) or sub-structures (not shown) which form the shell 302. Welding can result in visible weld lines. Welding is a fabrication process by which two or more pieces are joined together. For example, friction stir welding is a process by which two pieces are joined without melting either piece or any of the material forming the pieces. A tool is rotated a speed high enough to soften each of the pieces at an interface (i.e., where the pieces contact each other and will be adjoined). A profiled pin follows the tool (or can be incorporated into the tool) to mix or stir the softened materials at the interface, which fuses the softened material from each of the pieces.

Figure 4:
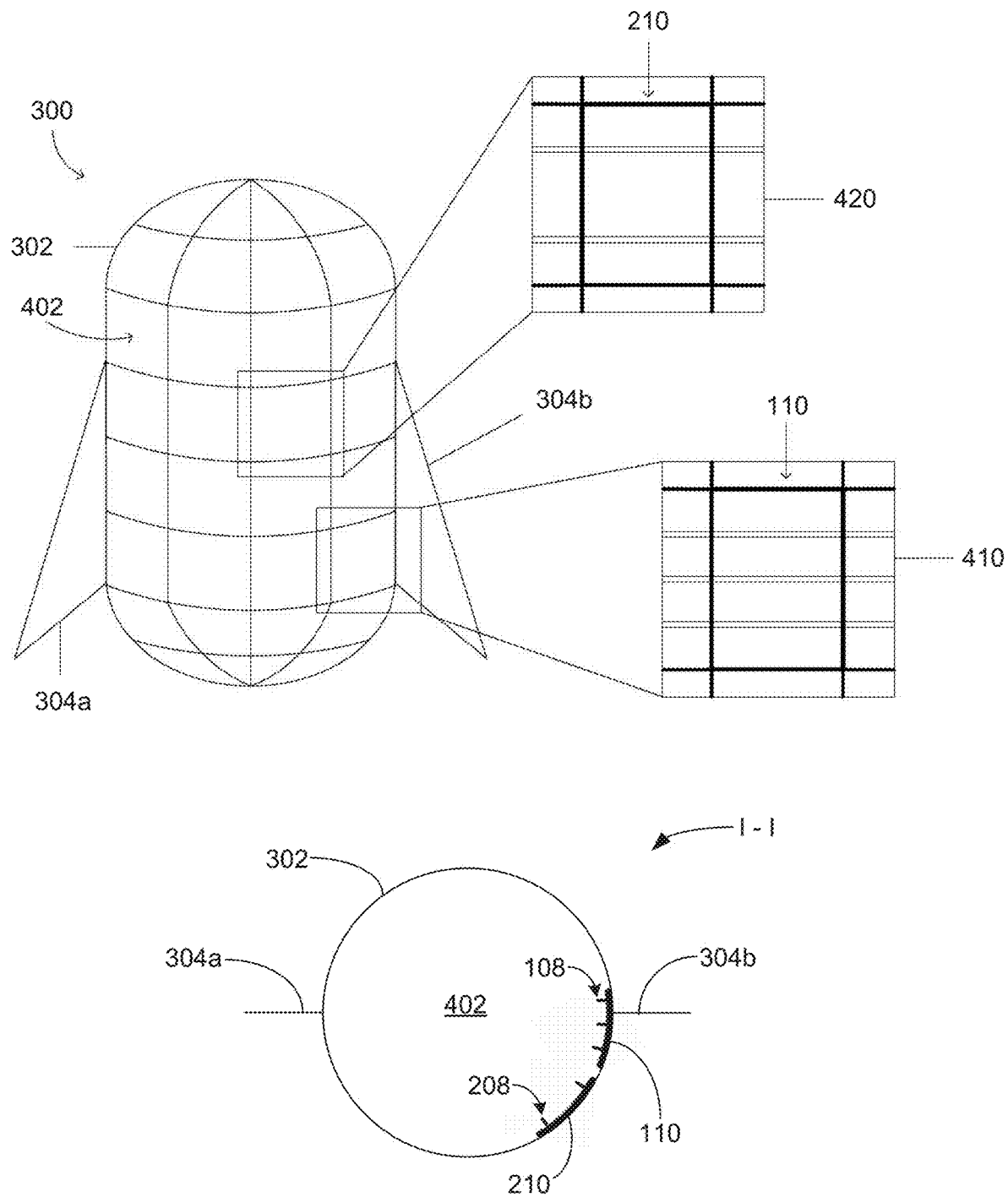
FIG. 4 illustrates an example internal cavity of the example propellant tank.

FIG. 4 shows a cross-sectional view of the propellant tank 300 taken along line I-I of FIG. 3. The propellant tank 300 includes the shell 302 forming a cavity 402 to hold the liquid propellant. The shell 302 is formed from panels 110, 210, as shown in magnified views 410, 420, respectively, joined, such as by welding. Though individual panels can be joined to form the shell 302, columns, rows, or segments (i.e., portions including multiple panels) which include elements of the panels 110, 210 can be joined to form the shell 302. For example, columns, rows, segments (e.g., portions being square or rectangular in shape), or combinations or multiples thereof, each having multiple panels, can be manufactured. Then, the columns, rows, or segments can be welded together to form the shell 302.

The panels 110, 210 can have different thermal profiles due their respective locations within the shell 302 (e.g., panel 210 has a first thermal profile and panel 210 has a second thermal profile). The thermal profiles are sets of time-temperature data associated with temperature measurements (i.e., changes in temperature over time). Each location can have a different thermal profile due to differences in forces (e.g., friction forces) exerted on those locations during launch, re-entry, or descent. For example, the differences in thermal profiles can be caused by one area having strakes and another area not having strakes. As another example, the differences in thermal profiles can be caused by panels higher within the shell during launch or lower within the shell during re-entry or descent.

The panels 110, 210 can have different characteristics based on the location of the panels 110, 210 within the shell 302. These characteristics can affect the TCCS ratio of the respective panels 110, 210. These characteristics include a number of heat fins, a heat fin aspect ratio (i.e., ratio of fin height to distance between fins), a thickness of heat fins, a taper of heat fins, the like, or combinations thereof. For example, the panel 110 can have a higher heat fin aspect ratio than the panel 210. Assuming the heat fins of the panel 110 and the panel 210 are the same height, more heat fins in the same area reduces the distance between heat fins, which provides a higher heat fin aspect ratio. A higher heat fin aspect ratio has an increased amount of heat dissipation relative to a lower heat fin aspect ratio. Since the panel 110 and the panel 210 occupy the same area, the panel 110 can more efficiently dissipate heat than the panel 210.

The panels 110, 210 can have the different characteristics based on the location due to the thermal capacity requirements associated with the location at which the panels 110, 210 are positioned within the propellant tank 300. For example, the panel 110, having more heat fins and a higher heat fin aspect ratio, is located on a portion of the shell 302 at or near the strakes 304a, 304b. The portion of the shell 302 to which the strakes 304a, 304b are attached are exposed to greater thermal loads. The greater thermal loads are caused by the thermal load generated by the strakes 304a, 304b because of the increased surface area. The heat on the strakes 304a, 304b during launch, re-entry, or descent of the propellant tank 300, such as caused by friction, is conducted to the portion of the shell 302 to which the strakes 304a, 304b are attached. This heat can then be conducted to adjacent areas of the shell 302 of the propellant tank 300. Since the panel 110 is exposed to higher thermal loads than the panel 210, the panel 110 needs to dissipate heat more efficiently. To do so, the panel 110 can have more heat fins, a higher heat fin aspect ratio, or both more fins and the higher heat fin aspect ratio. As another example, the panel 210, having fewer heat fins and a lower heat fin aspect ratio, is located on a portion of the shell 302 that is a given distance from the strakes 304a, 304b. Although the shell 302 at the panel 210 is exposed to a given thermal load, that thermal load is less than the thermal load to which the panel 110 is exposed. Therefore, the panel 210 can be less efficient in dissipating heat than the panel 110. To do so, the panel 210 can have fewer heat fins, a lower heat fin aspect ratio, or both fewer heat fins and the lower heat fin aspect ratio.

As yet another example, panels on a portion of the shell 302 that are lower within the shell 302 during re-entry or descent can have a greater TCCS ratio, as compared to panels that are higher within the shell, due to the increased thermal load (i.e., lower panels are exposed to greater friction forces, which increases the amount of heat generated in the lower panels). As still another example, panels on a portion of the shell 302 that higher within the shell 302 during launch can have a greater TCCS ratio, as compared to panels that are lower within the shell, due to the increased thermal load (i.e., higher panels are exposed to greater friction forces, which increases the amount of heat generated in the higher panels).

The TCCS ratios of the panels of the shell 302 can change along the height of the propellant tank 302, the circumference of the propellant tank 302, or both the height and the circumference of the propellant tank 302. For example, panels at or near the strakes 304a, 304b can have the highest TCCS ratio. Panels at a midpoint between the strakes 304a, 304b have the lowest TCCS ratio. And panels between the midpoint and the strakes 304a, 304b have a TCCS ratio between the highest and lowest TCCS ratios. These differences in TCCS ratios account for the differing thermal loads to which the respective areas are exposed. As another example, panels at or near the portion of the shell facing the Earth upon launch, re-entry, or descent can have the highest TCCS ratio. Panels at or near the portion of the shell facing away from the Earth upon launch, re-entry, or descent have the lowest TCCS ratio. And panels at a midpoint along the height of the shell have the lowest TCCS ratio. These differences in TCCS ratios account for the differing thermal loads to which the respective areas are exposed.

As yet another example, panels at or near the portion of the shell facing the Earth upon launch, re-entry, or descent and at or near the strakes 304a, 304b can have the highest TCCS ratio. Panels at or near the portion of the shell facing away from the Earth upon launch, re-entry, or descent and distanced from the strakes 304a, 304b have the lowest TCCS ratio. And other panels can have carrying TCCS ratios between the highest and lowest TCCS ratios based on their respective locations on the shell.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A method of making a component of a rocket, the method comprising:
    forming a shell having a cavity that is created by adjoining multiple panels to one another, wherein the multiple panels comprise:
        a first panel that includes first heat fins having a first thermal capacity to component stiffness (TCCS) ratio, the first panel being located at a first position of the shell and having a first thermal profile, and
        a second panel that includes second heat fins having a second TCCS ratio different from the first TCCS ratio, the second panel located at a second position of the shell and having a second thermal profile that differs from the first thermal profile; and
    adjoining a strake to the shell such that the second panel at the second position is in contact with the strake or closer to the strake than the first panel at the first position.

2. The method of claim 1, wherein the second TCCS ratio is greater than the first TCCS ratio.

3. The method of claim 1, wherein the first and the second TCCS ratios are each based on a quantity, an aspect ratio, a thickness, or a taper of the first or the second heat fins, or combinations thereof.

4. The method of claim 1, further comprising:
    determining that the first position is at a portion of the shell that i) is lower than the second position during re-entry or descent of the rocket or ii) is higher than the second position during launch of the rocket; and
    fabricating the first panel so that the first TCCS ratio is greater than the second TCCS ratio.

5. The method of claim 4, wherein
    the multiple panels further comprise a third panel having a third thermal profile,
    the third panel includes third heat fins having a third TCCS ratio,
    the third panel is to be located at a portion of the shell that is between the first and the second positions, and
    the method further comprises fabricating the third panel so that the third TCCS ratio is between the first and the second TCCS ratios.

6. The method of claim 1, further comprising:
    determining that the second position is at a portion of the shell that includes the strake; and
    fabricating the second panel so that the number of first heat fins is less than the number of second heat fins.

7. The method of claim 6, further comprising attaching the strake to the shell, the strake contacting the second first panel.

8. The method of claim 1, wherein the adjoining of the multiple panels to one another is performed so that the first and the second heat fins extend inwardly into the cavity from the first and the second panels.

9. The method of claim 1, wherein the adjoining of the multiple panels to one another is performed so that the first and the second heat fins are located on an internal surface of the shell and inside the cavity.

10. The method of claim 1, wherein adjoining the multiple panels to one another comprises welding or friction stir welding the multiple panels to one another.

11. The method of claim 1, further comprising:
    milling a sheet having a thickness to form each panel of the multiple panels, wherein milling the sheet forms sidewalls and the first or the second heat fins, wherein the first and the second heat fins extend from a first sidewall to an opposing sidewall of each panel, and wherein the thickness is equal to a height of the sidewalls.

12. A method of making a component of a rocket, the method comprising:
    forming a first panel to have a first thermal profile and to include first heat fins having a first thermal capacity to component stiffness (TCCS) ratio;
    forming a second panel to have a second thermal profile and to include second heat fins having a second TCCS ratio, wherein the second thermal profile differs from the first thermal profile;
    forming a shell having a cavity that is created by adjoining multiple panels to one another, the multiple panels comprising the first and the second panels; and
    milling a sheet having a thickness to form each panel of the multiple panels, wherein milling the sheet forms sidewalls and the first or the second heat fins, wherein the first and the second heat fins extend from a first sidewall to an opposing sidewall of each panel, and wherein the thickness is equal to a height of the sidewalls.

13. The method of claim 12, wherein the first and the second TCCS ratios are each based on a quantity, an aspect ratio, a thickness, or a taper of the first or the second heat fins, or combinations thereof.

14. The method of claim 12, further comprising adjoining a strake to the first panel of the shell, wherein the number of first heat fins is greater than the number of second heat fins.

15. The method of claim 12, further comprising:
    forming the first panel so that the first TCCS ratio is greater than the second TCCS ratio; and
    forming the shell so that the first panel is at a portion of the shell that i) is lower than the second panel during re-entry or descent of the rocket or ii) is higher than the second panel during launch of the rocket.

16. The method of claim 12, wherein the adjoining of the multiple panels to one another is performed so that the first and the second heat fins extend inwardly into the cavity from the first and the second panels.

17. The method of claim 12, wherein the adjoining of the multiple panels to one another is performed so that the first and the second heat fins are located on an internal surface of the shell and inside the cavity.

18. The method of claim 12, wherein adjoining the multiple panels to one another comprises welding or friction stir welding the multiple panels to one another.

19. A method of making a component of a rocket, the method comprising:

forming a shell having a cavity that is created by adjoining multiple panels to one another, wherein the multiple panels comprise:
- a first panel that includes first heat fins having a first thermal capacity to component stiffness (TCCS) ratio, the first panel being located at a first position of the shell and having a first thermal profile, and
- a second panel that includes second heat fins having a second TCCS ratio different from the first TCCS ratio, the second panel located at a second position of the shell and having a second thermal profile that differs from the first thermal profile; and milling a sheet having a thickness to form each panel of the multiple panels, wherein milling the sheet forms sidewalls and the first or the second heat fins, wherein the first and the second heat fins extend from a first sidewall to an opposing sidewall of each panel, and wherein the thickness is equal to a height of the sidewalls.

* * * * *